(12) United States Patent
Naito

(10) Patent No.: US 8,153,248 B2
(45) Date of Patent: Apr. 10, 2012

(54) PLASTIC LENS AND METHOD OF PRODUCING PLASTIC LENS

(75) Inventor: Shuji Naito, Minowamachi (JP)

(73) Assignee: Seiko Epson Corporation, Tokyo (JP)

( * ) Notice: Subject to any disclaimer, the term of this patent is extended or adjusted under 35 U.S.C. 154(b) by 1061 days.

(21) Appl. No.: 11/997,845

(22) PCT Filed: Jul. 27, 2006

(86) PCT No.: PCT/JP2006/315365
§ 371 (c)(1),
(2), (4) Date: Feb. 4, 2008

(87) PCT Pub. No.: WO2007/018108
PCT Pub. Date: Feb. 15, 2007

(65) Prior Publication Data
US 2010/0091373 A1  Apr. 15, 2010

(30) Foreign Application Priority Data

Aug. 5, 2005 (JP) .................. 2005-227574

(51) Int. Cl.
*G02B 1/11* (2006.01)
*B05D 5/06* (2006.01)
*B32B 5/16* (2006.01)

(52) U.S. Cl. ........ 428/328; 359/586; 427/162; 427/164; 427/419.2; 427/419.5; 427/419.8; 428/331; 428/451

(58) Field of Classification Search .................. 428/328, 428/331, 451; 359/586; 427/162, 164, 419.2, 427/219.5, 419.8
See application file for complete search history.

(56) References Cited

U.S. PATENT DOCUMENTS

| | | | |
|---|---|---|---|
| 4,930,879 A | 6/1990 | Iryo et al. | |
| 5,181,142 A | 1/1993 | Asai et al. | |
| 6,340,404 B1 * | 1/2002 | Oka et al. | 156/230 |
| 6,703,131 B1 | 3/2004 | Kayanoki | |
| 7,604,866 B2 * | 10/2009 | Ohashi et al. | 428/446 |
| 2005/0041298 A1 | 2/2005 | Toda et al. | |

FOREIGN PATENT DOCUMENTS

| | | |
|---|---|---|
| EP | 0 436 372 A2 | 7/1991 |
| EP | 0 827 975 A2 | 3/1998 |
| JP | 11-310755 A | 11/1999 |
| JP | 2000-144048 A | 5/2000 |
| JP | 2004-264778 A | 9/2004 |
| WO | 00/78879 A1 | 12/2000 |
| WO | WO 2004/113966 A1 * | 12/2004 |

* cited by examiner

*Primary Examiner* — D. S. Nakarani
(74) *Attorney, Agent, or Firm* — Sughrue Mion, PLLC

(57) ABSTRACT

A primer layer is formed on a plastic lens substrate, a hard coat layer is formed on the primer layer using a coating composition comprising metal oxide fine particles, an organosilicon compound represented by the general formula $R^1SiX^1_3$, and a compound having a biphenyl sulfide compound, and an organic antireflective layer.

In the plastic lens comprising a plastic lens substrate as obtained above, a plastic lens having excellent durability, impact resistance and mar resistance, and a method of producing the plastic lens are provided.

3 Claims, No Drawings

PLASTIC LENS AND METHOD OF PRODUCING PLASTIC LENS

TECHNICAL FIELD

The present invention relates to a plastic lens and a method of producing the plastic lens.

BACKGROUND ART

Plastic lenses are lightweight, has excellent moldability, processability, dyeing affinity and the like, and has high safety because of being hard to break, as compared with glass lenses, and therefore are rapidly spreading in the field of eyeglass lenses. Recently, high refractive index materials such as thiourethane resins or episulfide resins are developed in order to answer further requirements of thin and lightweight eyeglass lenses.

On the other hand, plastic lenses are liable to be scratched, as compared with glass lenses. Therefore, it is generally carried out that a hard coat layer is formed on a surface of a plastic lens to improve surface hardness. Further, an antireflective layer is formed on the surface of the hard coat layer by depositing an inorganic substance thereon for the purpose of preventing surface reflection, and an antifouling layer comprising an organosilicon compound containing fluorine is further formed on the surface of the antireflective layer for the purpose of improving water-repellent and oil-repellent properties of the surface. Thus, the plastic lenses are further extending as an advanced lens by virtue of technical innovation of surface treatment.

On the other hand, a plastic lens having both a hard coat layer and an antireflective layer formed thereon has the disadvantage that its impact resistance markedly deteriorates. Some means are proposed on the approach to improve impact resistance of such a plastic lens.

For example, a technique of using a primer composition comprising an ester-based thermoplastic elastomer as a main component to improve impact resistance is proposed as described in, for example, JP-A-11-310755. However, this primer composition has a property that it is difficult to obtain adhesion to particularly a hard coat formed on a surface of a primer layer, and thus had the problem on durability. In addition, impact resistance is improved by the primer layer, but it is not yet reached to a level satisfied on practical use.

Apart from the above, plastic lenses generally have the problem of low heat resistance. With increasing refractive index of plastic lens resin materials, heat resistance of the resin material itself tends to decrease. Due to this tendency, an inorganic antireflective layer formed on an upper layer cannot follow thermal expansion deformation of a plastic lens, and as a result, there is the problem of causing fog or cracks. The problem tends to be remarkable with increasing refractive index of a plastic lens.

Against such a problem, when an antireflective layer comprising an organic thin film is formed on a plastic lens substrate, the layer can follow thermal expansion deformation of the plastic lens substrate, thereby heat resistance can be improved. However, the antireflective layer comprising an organic thin film has relatively large porosity as compared with an inorganic antireflective layer, and cannot substantially be expected to have properties (protecting effect) of shielding factors that deteriorate durability of a plastic lens, such as oxygen, moisture and ultraviolet light, from the outside of the lens. As a result, heat resistance is improved as compared with the case of using an inorganic antireflective layer, but durability tends to deteriorate.

To improve the durability, an approach of improving durability of a hard coat layer itself formed on a lower layer, or an approach of interposing a primer layer between a hard coat layer and a plastic substrate to improve adhesion therebetween is considered.

A technique of forming a hard coat layer using a coating composition containing metal oxide fine particles comprising as a main component, titanium oxide having a rutile crystal structure is proposed as the former. The hard coat layer uses low photoactive titanium oxide. Consequently, durability is improved, and high refractive index can be maintained, as compared with the conventional titanium oxide having an anatase crystal structure, as described in, for example, JP-A-11-310755.

The latter is a technique having both the effect of improving adhesion and the effect of improving impact resistance, by using a primer layer as same as in a surface modification technique such as saponification or etching by plasma irradiation, as described in, for example, JP-A-2000-144048.

However, plastic lenses having an antireflective layer comprising an organic thin film had the problem that where a hard coat and a primer technique are combined, it is difficult to obtain adhesion between the primer layer and the hard coat layer, and durability deteriorates. Further, although impact resistance is improved to a certain extent, it was not reached to a sufficient level. The reason that it is difficult to obtain the adhesion and impact resistance is considered to be that a bonding force between a binder resin in the primer layer and a binder resin in the hard coat layer is not sufficient. To improve the bonding force, it is necessary to increase an amount of functional groups contributing to adhesion of those binder resins. However, where such an approach is taken, there are many cases that crosslinking density of the primer layer and hard coat layer themselves decreases, and mar resistance deteriorates.

Thus, where a primer layer and a hard coat layer are combined in a plastic lens having an antireflective layer comprising an organic thin film, it was difficult to obtain properties responding to all of durability, impact resistance and mar resistance.

The invention has been made in view of the above circumstances.

Objects of the invention are to provide a plastic lens comprising a plastic lens substrate having formed thereon a primer layer, a hard coat layer and an organic antireflective layer, in the order from the surface of the plastic lens substrate, the plastic lens having excellent durability, impact resistance and mar resistance, and a method of producing the plastic lens.

DISCLOSURE OF THE INVENTION

As a result of keen investigations to the above problems, the present inventors have found that durability, impact resistance and mar resistance can be imparted to optical articles having an antireflective layer constituted of an organic thin film by introducing a compound having a specific structure into a hard coat layer, and have completed the invention.

To achieve the above objects, the plastic lens of the invention comprises a plastic lens substrate having formed thereon a primer layer, a hard coat layer and an organic antireflective layer, in the order from the surface of the plastic lens substrate, the hard coat layer being a coating film formed from a coating composition comprising the following component A, component B and component C.

Component A: Metal oxide fine particles

Component B: An organosilicon compound represented by the following formula:

wherein $R^1$ represents an organic group with 2 or more carbon atoms, having a polymerizable reactive group, and $X^1$ represents a hydrolyzable group.

Component C: A compound having a biphenyl sulfide structure, represented by the following formula (1):

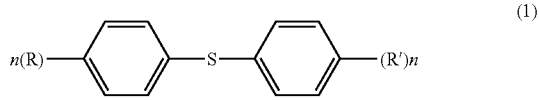

(1)

wherein R and R' each represent a hydrocarbon group or a hydroxyl group, and n is from 0 to 5.

According to the above composition, the compound having a biphenyl sulfide structure as the component C acts as an adhering component between the primer layer and the hard coat layer, thereby durability can be improved. The biphenyl sulfide structure has a structure that rigid benzene rings are bonded to a sulfur atom, and therefore, the compound having such a specific structure has flexibility. It is therefore considered that the compound adheres to both the primer layer and the hard coat layer, and simultaneously exhibits flexibility. As a result, impact resistance can be improved. Further, the compound having a biphenyl sulfide structure is used in the hard coat layer, but is considered to localize between the primer layer and the hard coat layer. Thus, the compound does not substantially contribute to a crosslinking reaction of the hard coat layer itself, and therefore has the effect of not deteriorating mar resistance.

The plastic lens of the invention is characterized in that the component C is contained in the coating composition in an amount of from 0.03 to 1.0% by weight based on the weight of the solid content in the coating composition. The term "solid content in the coating composition" used herein means components contained in a coating film obtained by drying and curing the coating composition, and specifically means components of a metal oxide, an organosilicon compound, a multifunctional epoxy compound and a catalyst.

Where an amount of the compound having a biphenyl sulfide structure as the component C is less than 0.03% by weight, the compound lacks in the effect of acting as a adhering component between the primer layer and the hard coat layer and the effect of exhibiting flexibility, and as a result, durability and impact resistance deteriorate. On the other hand, where the amount exceeds 1.0% by weight, the compound adversely affects a crosslinking reaction of the hard coat layer itself, and as a result, mar resistance deteriorates.

The plastic lens of the invention is characterized in that the coating composition for forming the hard coat layer further contains a multifunctional epoxy compound.

Due to that the coating composition for forming the hard coat layer contains the compound having a biphenyl sulfide structure, durability and impact resistance can be improved. However, by further containing the multifunctional epoxy compound in the coating composition, water resistance of the hard coat layer is further improved, and additionally, adhesion to the primer layer formed on a lower layer can further be stabilized.

The plastic lens of the invention is characterized in that the primer layer is a coating film formed from the coating composition containing a polyester resin.

Various resins such as an epoxy resin, a urethane resin, a polyvinyl acetal resin and a polyester resin can be selected and used as the resin for use in the primer layer. Of those, use of the polyester resin makes it possible to exhibit durability, impact resistance, pot life of a coating liquid, hydroscopic stability, dying stability, low temperature curing property and the like.

The polyester resin has excellent properties in adhesion to a plastic lens substrate, impact resistance, mar resistance and the like, but had the disadvantage that it is difficult to obtain adhesion to the hard coat layer formed on an upper layer. To this disadvantage, by concurrently using the component C, the compound having a biphenyl sulfide structure acts as an adhering component between the primer layer and the hard coat layer, thereby durability can be improved. The biphenyl sulfide structure has a structure that rigid benzene rings are bonded to a sulfur atom, and therefore, the compound having such a specific structure has flexibility. Therefore, it is considered that the compound adheres to both the primer layer and the hard coat layer, and simultaneously exhibits flexibility. As a result, impact resistance can be improved. Further, the compound having a biphenyl sulfide structure is used in the hard coat layer, but is considered to localize between the primer layer and the hard coat layer, and does not substantially contribute to a crosslinking reaction of the hard coat layer itself. Therefore, the compound has the effect of not deteriorating mar resistance.

The plastic lens of the invention is characterized in that the organic antireflective layer comprises a coating film formed from a coating composition comprising the following component D and component E, and has a refractive index at least 0.10 lower than the refractive index of the hard coat layer.

Component D: An organosilicon compound represented by the following formula:

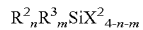

wherein $R^2$ represents an organic group having a polymerizable reactive group, $R^3$ represents a hydrocarbon group having from 1 to 6 carbon atoms, $X^2$ represents a hydrolyzable group, n is 0 or 1, and m is 0 or 1.

Component E: Silica fine particles having an average particle diameter of from 1 to 150 nm.

According to this embodiment, due to that the antireflective layer is an organic thin film formed from a coating composition comprising the component D and the component E, the antireflective layer can follow thermal expansion deformation of the plastic lens substrate, and as a result, heat resistance can be improved. Additionally, this enables mar resistance of the organic thin film itself to exhibit, and simultaneously, enables adhesion to the hard coat layer formed on a lower layer, and a low refractive index for obtaining a low reflectivity to exhibit.

A method of producing a plastic lens according to the invention comprises a step of forming a primer layer on a plastic lens substrate, a step of forming a hard coat layer on the primer layer using a coating composition comprising the following component A, component B and component C, and a step of forming an organic antireflective layer having a refractive index at least 0.10 lower than a refractive index of the hard coat layer using a composition comprising the following component D and component E.

Component A: Metal oxide fine particles

Component B: An organosilicon compound represented by the following formula

wherein R¹ represents an organic group with 2 or more carbon atoms, having a polymerizable reactive group, and X¹ represents a hydrolysable group.

Component C: A compound having a biphenyl sulfide structure, represented by the following formula (1):

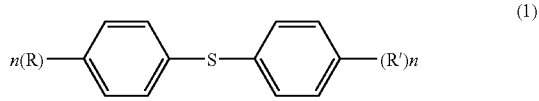

wherein R and R' each represent a hydrocarbon group or a hydroxyl group, and n is from 0 to 5.

Component D: An organosilicon compound represented by the following formula:

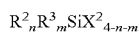

wherein $R^2$ represents an organic group having a polymerizable reactive group, $R^3$ represents a hydrocarbon group having from 1 to 6 carbon atoms, $X^2$ represents a hydrolyzable group, n is 0 or 1, and m is 0 or 1.

Component E: Silica fine particles having an average particle diameter of from 1 to 150 nm.

According to this production method, the primer layer is formed on the plastic lens substrate, and the hard coat layer is formed on the primer layer using the composition comprising the component A, the component B and the component C. As a result, the compound having a biphenyl sulfide structure as the component C contained in the coating composition develops flexibility, while acting as an adhering component between the primer layer and the hard coat layer, thereby improving durability and impact resistance. Further, the organic antireflective layer formed on the hard coat layer is formed from the coating composition comprising the component D and component E. As a result, the antireflective layer can follow thermal expansion deformation of the plastic lens substrate, thereby heat resistance can be improved. In addition to this, mar resistance of the organic antireflective layer itself can be exhibited, and adhesion to the hard coat layer formed on a lower layer, and a low refractive index for obtaining a low reflectivity can be exhibited. That is, a plastic lens having excellent durability, impact resistance and mar resistance can be obtained.

BEST MODE FOR CARRYING OUT THE INVENTION

The embodiments of the plastic lens and the method of producing the plastic lens according to the invention are described below.

The plastic lens according to this embodiment comprises a plastic lens substrate, a primer layer formed on a surface of the plastic lens substrate, a hard coat layer formed on an upper surface of the primer layer, and an organic antireflective layer formed on an upper surface of the hard coat layer.

The plastic lens substrate, primer layer, hard coat layer and organic antireflective layer (hereinafter simply referred to as an "antireflective layer") are described below.

1. Plastic Lens Substrate

A material of the plastic lens substrate (hereinafter simply referred to as a "lens substrate") is not particularly limited so long as it is a plastic resin. A lens material having a refractive index of 1.6 or higher is preferably used to obtain a refractive index difference to the antireflective layer comprising an organic thin film, formed on the upper layer of the lens substrate surface. Examples of the lens material having a refractive index of 1.6 or higher include polythiourethane plastics produced by reacting a compound having an isocyanate group or an isothiocyanate group and a compound having a mercapto group, and episulfide plastics produced by polymerizing raw material monomers containing a compound having an episulfide group, and curing.

The compound having an isocyanate group or an isothiocyanate group, that is the main component of the polythiourethane plastics can use the conventional compounds.

Specific examples of the compound having an isocyanate group include ethylene diisocyanate, trimethylene diisocyanate, 2,4,4-trimethylhexane diisocyanate, hexamethylene diisocyanate, and m-xylene diisocyanate.

The compound having a mercapto group can use the conventional compounds.

Examples of the compound having a mercapto group include aliphatic polythiols such as 1,2-ethane dithiol, 1,6-hexane dithiol and 1,1-cyclohexane dithiol, and aromatic polythiols such as 1,2-dimercaptobenzene and 1,2,3-tris (mercaptomethyl)benzene.

To achieve a high refractive index of the plastic lens, a polythiol having a sulfur atom other than a mercapto group can more preferably be used. Examples of such a polythiol include 1,2-bis(mercaptomethylthio)benzene, 1,2,3-tris (mercaptoethylthio)benzene and 1,2-bis((2-mercaptoethyl) thio)-3-mercaptopropane.

The compound having an episulfide group used as a raw material monomer of the episulfide plastics can use the conventional compounds having an episulfide group without any limitation.

Examples of such a compound include episulfide compounds obtained by substituting a part or the whole of oxygen atoms in epoxy groups of the conventional epoxy compound with sulfur atoms.

To achieve a high refractive index of the plastic lens, a compound having a sulfur atom other than an episulfide group can more preferably be used. Examples of such a compound include 1,2-bis(β-epithiopropylthio)ethane, bis-(β-epithiopropyl)sulfide, 1,4-bis(β-epithiopropylthiomethyl)benzene, 2,5-bis(β-epithiopropylthiomethyl)-1,4-dithiane, and bis-(β-epithiopropyl)disulfide.

Polymerization method for producing the lens substrate used in the invention is not particularly limited, and can use polymerization methods generally used in producing lens substrates.

For example, where a vinyl monomer is used as a material, a lens substrate can be produced by heat curing the monomer using a thermal polymerization initiator such as an organic peroxide. Further, a lens substrate can be produced by using a photopolymerization initiator such as benzophenone, and curing the monomer by irradiation with ultraviolet rays.

In the case of using a polythiourethane plastic produced by reacting the compound having an isocyanate group or an isothiocyanate group and the compound having a mercapto group, a lens substrate can be produced by mixing the compound having an isocyanate group or an isothiocyanate group and the compound having a mercapto group, adding a curing catalyst for a urethane resin to the resulting mixture, followed by mixing, polymerizing the resulting mixture under heating, and then curing the resulting polymer. Specific examples of the curing catalyst used include amine compounds such as ethylamine, ethylenediamine, triethylamine and tributylamine; dibutyltin dichloride; and dimethyltin dichloride.

In the case of using an episulfide plastic obtained by polymerizing raw material monomers containing the compound having an episulfide group, as a lens material, and curing the resulting polymer, a lens substrate can be produced by using the compound having an episulfide group alone or mixing the compound with other monomer copolymerizable with the compound having an episulfide group, adding a curing catalyst for an epoxy resin thereto, followed by mixing, polymerizing the resulting mixture under heating, and then curing the resulting polymer.

The curing catalyst for an epoxy resin is not particularly limited, and any curing catalyst for an epoxy resin can be used. Examples of such a curing catalyst used include tertiary amines such as dimethyl benzylamine, dimethyl cyclohexylamine, diethyl ethanolamine, dibutyl ethanolamine, and tridimethyl aminomethylphenol; and imidazoles such as ethyl methyl imidazole.

Examples of the other monomer copolymerizable with the compound having an episulfide group include a compound having a hydroxyl group, a compound having a mercapto group, a primary or secondary amine, and a compound having a carboxyl group.

Specific examples of the compound having a hydroxyl group include alcohols such as isopropyl alcohol and n-hexyl alcohol; and polyhydric alcohols such as ethylene glycol, 1,6-hexanediol, pentaerythritol dimethacrylate and pentaerythritol diacrylate.

Specific examples of the compound having a mercapto group include thiophenol, ethylthioglycolate, bis(2-mercaptoethyl)sulfide and 2,5-dimercaptomethyl-1,4-dithiane.

2. Primer Layer

The primer layer is formed on a surface of the lens substrate. The primer layer is present at the interface between the plastic lens substrate and the hard coat layer described hereinafter, and plays a role of improving durability of a surface treatment layer formed on the lens substrate. Additionally, the primer layer also has the property as a layer for absorbing impact from the outside, and thus has the property to improve impact resistance. The primer layer is formed using a coating composition containing a resin as a binder component and metal oxide fine particles as a filler component.

The resin as a binder component exhibits adhesion to both the lens substrate and the hard coat layer. The metal oxide fine particles as a filler component exhibit a refractive index of the primer, and simultaneously acts to improve a crosslinking density of the primer layer, thereby attaining to improve water resistance, weather resistance and light resistance.

Examples of the resin as a binder component include a polyester resin, a polyurethane resin, an epoxy resin, a melamine resin, a polyolefin resin, a urethane acrylate resin and an epoxy acrylate resin. Of those resins, the polyester resin can preferably be used from the standpoints of durability, impact resistance, liquid pot life, hygroscopic stability, dyeing stability and low temperature curing property. Many functional groups acting to adhesion are present in the polyester resin. Therefore, the polyester resin has excellent adhesion to the lens substrate and the hard coat layer, thereby durability is improved.

Examples of the polyester resin that can be used include polyester-based thermoplastic elastomers described in JP-A-2000-144048. The polyester-based thermoplastic elastomer is a multiblock copolymer using a polyester as a hard segment (H) constituent and a polyether or a polyester as a soft segment (S) constituent. Weight ratio (H/S) of hard segment to soft segment is in a range of from 30/70 to 90/10, and preferably from 40/60 to 80/20.

The polyester as the hard segment constituent basically comprises dicarboxylic acids and a low molecular weight glycol.

Examples of the dicarboxylic acids include aromatic dicarboxylic acids such as terephthalic acid, isophthalic acid, phthalic acid and 2,6-naphthalenedicarboxylic acid; linear saturated aliphatic dicarboxylic acids having from 4 to 20 carbon atoms such as succinic acid, adipic acid, azelaic acid, decamethylenedicarboxylic acid and octadecanedicarboxylic acid; aliphatic oxocarboxylic acids such as ε-oxycaproic acid; dimmer acids such as a dibasic acid obtained by dimerization of an aliphatic monocarboxylic acid having a double bond; and their ester-forming derivatives. Of those, terephthalic acid and 2,6-naphthalenedicarboxylic acid can preferably be used.

Examples of the low molecular weight glycol include aliphatic glycols such as ethylene glycol, trimethylene glycol, 1,4-butanediol, 1,5-pentanediol, 1,6-hexanediol and neopentyl glycol; cyclic glycols such as 1,6-cyclohexane dimethanol; and their ester forming derivatives. Of those, ethylene glycol and 1,4-butanediol can preferably be used.

On the other hand, the polyester as the soft segment constituent comprises dicarboxylic acids and a long-chain glycol.

Examples of the dicarboxylic acids include the same compounds as in the polyester as the hard segment constituent.

Examples of the long-chain glycol include poly(1,2-butadieneglycol), poly(1,4-butadieneglycol) and their hydrogenated products. Further, ε-caprolactone (C6), enantholactone (C7) and caprylolactone (C8) are also useful as the polyester component. Of those, ε-caprolactone can preferably be used.

Examples of the polyether as the soft segment constituent include poly(alkylene oxide)glycols such as poly(ethylene oxide)glycol, poly(1,2-propylene oxide)glycol, poly(1,3-propylene oxide)glycol and poly(tetramethylene oxide)glycol. Of those, poly(tetramethylene oxide)glycol can preferably be used.

A method of producing the polyester-based thermoplastic elastomer is, for example, as follows. A lower alkyl ester of dicarboxylic acid is subjected to ester exchange reaction by heating an aliphatic long-chain glycol and an excess low molecular weight glycol at a temperature of from 150 to 200° C. in the presence of a catalyst such as tetrabutyl titanate, thereby forming a low polymer. The low polymer thus formed is subjected to polycondensation by stirring the same under heating at a temperature of from 220 to 280° C. under high vacuum, thereby obtaining the polyester-based thermoplastic elastomer. The low polymer can also be obtained by a direct esterification reaction between the dicarboxylic acid, the long-chain glycol and the low molecular weight glycol.

The polyester-based thermoplastic elastomer can be used by mixing with other polymer. Examples of the other polymer to be mixed include conventional ester resins (PBT, PET and the like), amide resins and amide-based thermoplastic elastomers. When those other polymers are used for mixing, the proportion of those other polymers is less than 50%, and preferably less than 30%, based on the entire polymers used.

The polyester-based thermoplastic elastomer can be prepared into a solution-type primer composition. However, the polyester-based thermoplastic elastomer is desirably used as a primer composition in a form of an aqueous emulsion from the standpoints of processability and environmental protection. The aqueous emulsion can be formed by the conventional methods. Specifically, it is desirable to use a forced emulsification method of applying high mechanical shear force to a polymer in the presence of a surfactant (external emulsifying agent) to forcedly emulsify the polymer.

Examples of the metal oxide fine particles as the filler component that can be used include oxides of metals such as Si, Al, Ti, Sn, Sb, Ta, Ce, La, Fe, Zn, W, Zr and In. Of those, the metal oxide fine particles comprising titanium oxide as the main component are preferably used from the standpoints of refractive index, transparency, light resistance and stability. The metal oxide fine particles may be composite particles of titanium oxide and other inorganic oxide. Examples of the composite particles that can be used include composites of oxides of metals such as Si, Al, Sn, Sb, Ta, Ce, La, Fe, Zn, W, Zr and In, and titanium oxide. The metal oxide fine particles have an average particle diameter of preferably from 1 to 200 nm, and more preferably from 5 to 30 nm.

The metal oxide fine particles are preferably used by dispersing the same in a dispersant such as water, an alcohol or other organic solvent. In this case, the surface of inorganic oxide particles may be treated with an organosilicon compound or an amine compound in order to increase dispersion stability of the metal oxide fine particles.

Examples of the organosilicon compound used in the treatment include a monofunctional silane, a bifunctional silane, a trifunctional silane and tetrafunctional silane.

Examples of the amine compound used include ammonia; alkyl amines such as ethylamine, triethylamine, isopropylamine and n-propylamine; aralkyl amines such as benzylamine; alicyclic amines such as piperidine; and alkanol amines such as monoethanolamine and triethanolamine. Addition amount of those organosilicon compound and amine compound is preferably in a range of from about 1 to 15% by weight based on the weight of the inorganic oxide particles.

Of the above compounds used for the surface treatment, an organosilicon compound having an epoxy group is preferably used. Use of the metal oxide fine particles treated with the organosilicon compound having an epoxy resin enables bonding points to the polyester resin to increase, and enables the crosslinking density of the primer film to further increase, thereby durability is improved.

Where metal oxide fine particles containing titanium oxide are used as the metal oxide fine particles, it is preferable to contain composite oxide nuclear particles containing titanium oxide having a rutile crystal structure. However, where the metal oxide fine particles containing titanium oxide having a rutile crystal structure are used in the hard coat layer described hereinafter, because the hard coat layer has ultraviolet absorption performance, composite oxide fine particles containing titanium oxide having an anatase crystal structure having photoactive action higher than that of a rutile form can be used in the primer layer.

Other than titanium oxide, tin oxide can be used in the inorganic oxide fine particles. For example, inorganic oxide fine particles comprising tin oxide, tin oxide particles and zirconium oxide particles, or composite fine particles of tin oxide particles, zirconium oxide particles and silicon oxide particles, as a nucleus, the surface of which being covered with at least one composite colloidal particle of silicon oxide, zirconium oxide, antimony pentoxide, aluminum oxide or the like can be used.

Tin oxide has low refractive index as compared with titanium oxide, and is required to increase its use amount in order to obtain a primer layer having high refractive index. However, it is considered that tin oxide has small photoactive action as compared with titanium oxide. Therefore, tin oxide is preferably combined where the primer layer and hard coat layer themselves are required to have durability.

However, the composite oxide fine particles containing titanium oxide having a rutile crystal structure are more preferably used in the primer layer from the points of light resistance and refractive index. The composite oxide fine particles containing titanium oxide having a rutile crystal structure have excellent light resistance, and additionally has high refractive index as compared with an anatase form. Therefore, the amount of the composite oxide fine particles containing titanium oxide having a rutile crystal structure used in the primer layer can be reduced, and as a result, the amount of resin components contributing to adhesion can be increased.

If necessary, the thus obtained coating composition for formation of the primer layer can be used by diluting with a solvent. Examples of the solvent used for dilution include alcohols, esters, ketones, ethers and aromatics.

If necessary, the coating composition can contain small amounts of metal chelate compounds, surfactants, antistatic agents, ultraviolet absorbers, antioxidants, disperse dyes, oil-soluble dyes, pigments, photochromic compounds, hindered amine-based or hindered phenol-based light resistant and heat resistant stabilizers, and the like, thereby improving coatability and curing rate of a coating liquid, and coating film performance after curing.

In applying the coating composition (coating liquid), it is preferably to previously pre-treat a surface of the lens substrate for the purpose of improving adhesion between the lens substrate and the primer layer. The pre-treatment can use an alkali treatment, an acid treatment, a surfactant treatment, peeling/polishing treatment with inorganic or organic fine particles, a plasma treatment or the like.

The coating/curing method of the coating composition is that the coating composition is applied to the surface of the lens substrate using dipping, spin coating, spray coating, roll coating, flow coating or the like, and the resulting coating is dried by heating at a temperature of from 40 to 200° C. for several hours to form a primer layer. The primer layer has a thickness in a range of from 0.01 to 30 µm, and preferably from 0.05 to 30 µm. Where the primer layer has too small thickness, the performance of durability or impact resistance cannot be exhibited, and on the other hand, where the primer layer has too large thickness, surface smoothness may deteriorate, or appearance defects such as optical strain, white turbidity or clouding may generate.

3. Hard Coat Layer

The hard coat layer is formed the primer layer formed on the surface of the lens substrate.

The hard coat layer is required to have high refractive index in the same level as the plastic lens substrate having high refractive index, for the purpose of suppressing interference pattern. A method of using inorganic oxide fine particles having high refractive index is generally used to attain high refractive index of the hard coat layer. Specifically, colorless transparent inorganic oxide fine particles comprising composite oxides containing oxides (including their mixtures) of at least one metal selected from Al, Sn, Sb, Ta, Ce, La, Fe, Zn, W, Zr, In and Ti, and/or composite oxides containing at least two metals are used. Of those, the inorganic oxide fine particles containing titanium oxide are generally used from the points of refractive index, transparency, dispersion stability and the like.

However, where the inorganic oxide fine particles containing titanium oxide were used as a metal oxide for the hard coat layer, there was the following problem. Titanium oxide has the property (hereinafter referred to as "photoactivity") of acquiring activity when receiving light (ultraviolet rays), and decomposing an organic material by strong oxidative decomposition force. As a result, where titanium oxide is contained in the hard coat layer as its constituent, the titanium oxide decomposes organic materials such as a silane-coupling agent which is another main constituent of the hard coat layer, by photoactivity to cause cracks or peeling of the hard coat film, thereby durability quality tends to deteriorate.

Contrary to this, it is preferable to use a metal oxide containing titanium oxide having a rutile crystal structure. In other words, where metal oxide fine particles containing titanium oxide having a rutile crystal structure are used, various disadvantages due to photoactivity of titanium oxide can be improved. The reason for this is as follows. When a metal oxide containing titanium oxide changes its crystal structure from anatase form to rutile form, weather resistance and light resistance are further improved. Further, the anatase crystal has refractive index higher than that of the rutile crystal, and as a result, inorganic oxide fine particles having relatively high refractive index are obtained.

Differing that titanium oxide having a rutile crystal structure has the property of acquiring activity when receiving light (ultraviolet rays), and decomposing an organic material by strong oxidative decomposition force, the anatase titanium oxide has low photoactivity. The reason for this is as follows. When titanium oxide is irradiated with light (ultraviolet rays), electrons in valency electron zone of titanium oxide are excited to generate OH free radicals and $HO_2$ free radicals, and an organic material is decomposed by this strong oxidative force. However, the rutile titanium oxide is more stable in thermal energy than the anatase titanium oxide, and consequently, the amount of free radicals generated is very small. As a result, the hard coat layer having added thereto the titanium oxide having a rutile crystal structure has excellent weather resistance and light resistance, and there is no possibility that an antireflective layer constituted of an organic thin film is denatured by the hard coat layer, resulting in obtaining a plastic lens having excellent weather resistance and light resistance.

The hard coat layer in the plastic lens according to this embodiment is formed from a coating composition comprising the following component A, component B and component C.

Component A: Metal oxide fine particles
Component B: An organosilicon compound represented by the following formula

wherein $R^1$ represents an organic group with 2 or more carbon atoms, having a polymerizable reactive group, and $X^1$ represents a hydrolyzable group.

Component C: A compound having a biphenyl sulfide structure, represented by the following formula (1):

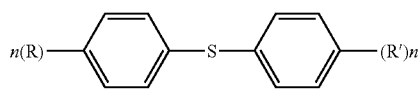

wherein R and R' each represent a hydrocarbon group or a hydroxyl group, and n is from 0 to 5.

The metal oxide fine particles as the component A are described below.

The component A preferably uses metal oxide fine particles having an average particle diameter of from 1 to 200 nm, comprising nuclear particles of composite oxides having a rutile crystal structure, comprising titanium oxide and tin oxide, or titanium oxide, tin oxide and silicon oxide, the surface of the fine particles being covered with a covering layer of a composite oxide comprising silicon oxide, and zirconium oxide and/or aluminum oxide.

As described hereinbefore, when titanium oxide is irradiated with light (ultraviolet rays), electrons in valency electron zone of titanium oxide are excited to generate OH free radicals and $HO_2$ free radicals, and an organic material is decomposed by this strong oxidative force. However, the rutile titanium oxide is more stable in thermal energy than the anatase titanium oxide, and consequently, the amount of free radicals generated is very small. However, free radicals are generated even in the rutile titanium oxide. Therefore, nuclear particles comprising composite oxides, the surface of the nuclear particles being covered with a covering layer of a composite oxide comprising silicon oxide, and zirconium oxide and/or aluminum oxide are preferably used. The reason for this is that free radicals generated by the nuclear particles similarly has strong oxidative force, but is not stable. As a result, the free radicals disappear by the catalytic action of the covering layer during passing through the covering layer.

Some techniques of obtaining titanium oxide having a rutile crystal structure are considered. A technique of forming a composite oxide with tin oxide, and the composite oxide with silicon oxide further added thereto are preferable. When the composite with tin oxide is added to the inorganic oxide fine particles, the amounts of titanium oxide and tin oxide contained in the inorganic oxide fine particles are that the $TiO_2/SnO_2$ weight ratio is in a range of from 1/3 to 20/1, and preferably from 1.5/1 to 13/1, when titanium oxide is calculated in terms of $TiO_2$, and tin oxide is calculated in terms of $SnO_2$.

When the amount of $SnO_2$ is decreasing than the above weight ratio range, the crystal structure shifts from rutile form to anatase form, and mixed crystals containing the rutile crystal and the anatase crystal are obtained, or the anatase crystal is obtained. On the other hand, when the amount of $SnO_2$ is increasing than the above weight ratio range, a rutile crystal structure intermediate between the rutile crystal of titanium oxide and the rutile crystal of tin oxide is formed, thus showing a crystal structure differing from a so-called rutile crystal of titanium oxide. Further, refractive index of the inorganic oxide fine particles obtained decreases.

In the case of adding a composite oxide with tin oxide, and the composite oxide having further added thereto silicon oxide, the amounts of titanium oxide, tin oxide and silicon oxide contained in the inorganic oxide fine particles are that the $TiO_2/SiO_2$ weight ratio is in a range of from 1/3 to 20/1, and preferably from 1.5/1 to 13/1, and the $(TiO_2+SnO_2)/SiO_2$ weight ratio is in a range of from 50/45 to 99/1, and preferably from 70/30 to 98/2, when titanium oxide is calculated in terms of $TiO_2$, tin oxide is calculated in terms of $SnO_2$, and silicon oxide is calculated in terms of $SiO_2$.

The content of $SnO_2$ is the same as in the case of adding the composite oxide with tin oxide. By further adding silicon oxide to the composite oxide, stability and dispersibility of the inorganic oxide fine particles obtained can be improved. When the amount of $SiO_2$ is decreasing than the above weight ratio range, the stability and dispersibility deteriorate. On the other hand, when the amount of $SiO_2$ is increasing than the above weight ratio range, the stability and dispersibility are further improved, but refractive index of the inorganic oxide fine particles obtained decreases, which is not preferable. However, free radicals generate even in the rutile titanium oxide. This generation is the same even in the case of using inorganic oxide fine particles containing two or more composite oxides containing titanium oxide, as the inorganic oxide fine particles containing titanium oxide.

The surface of nuclear particles comprising composite oxides having a rutile crystal structure is covered with a covering layer of a composite oxide comprising silicon oxide, and zirconium oxide and/or aluminum oxide.

The contents of silicon oxide, and zirconium oxide and/or aluminum oxide, contained in the covering layer are preferably selected from the following three items (a) to (c), depending on the combination of the composite oxides used.

(a) Case that Covering Layer is Formed with Composite Oxide of Silicon Oxide and Zirconium Oxide The amounts of silicon oxide and zirconium oxide contained in the covering layer are that the $SiO_2/ZrO_2$ weight ratio is in a range of from 50/50 to 99/1, and preferably from 65/35 to 90/10, when silicon oxide is calculated in terms of $SiO_2$, and zirconium oxide is calculated in terms of $ZrO_2$.

When the amount of $ZrO_2$ is larger than the above $SiO_2/ZrO_2$ weight ratio range, Zr atoms capable of trapping free radicals increase, but strain generates in the covering layer, and a dense covering layer is not formed. As a result, free radicals generated by the nuclear particles expose on the surface of the inorganic oxide fine particles, resulting in causing oxidation of organic materials. On the other hand, when the amount of $ZrO_2$ is smaller than the above $SiO_2/ZrO_2$ weight ratio range, a dense covering layer is liable to form. However, Zr atoms for trapping free radicals decrease, and free radicals generated by the nuclear particles expose on the surface of the inorganic oxide fine particles, resulting in causing oxidation of organic materials.

(b) Case that Covering Layer is Formed with Composite Oxide of Silicon Oxide and Aluminum Oxide The amounts of silicon oxide and aluminum oxide contained in the covering layer are that the $SiO_2/Al_2O_3$ weight ratio is in a range of from 60/40 to 99/1, and preferably from 68/32 to 95/5, when silicon oxide is calculated in terms of $SiO_2$, and aluminum oxide is calculated in terms of $Al_2O_3$.

When the amount of $Al_2O_3$ is larger than the above $SiO_2/Al_2O_3$ weight ratio range, Al atoms capable of trapping free radicals increase, but a dense covering layer is not formed. As a result, free radicals generated by the nuclear particles expose on the surface of the inorganic oxide fine particles, resulting in causing oxidation of organic materials. On the other hand, when the amount of $Al_2O_3$ is smaller than the above $SiO_2/Al_2O_3$ weight ratio, a dense covering layer is liable to be formed. However, Al atoms for trapping free radicals decrease, and free radicals generated by the nuclear particles expose on the surface of the inorganic oxide fine particles, resulting in causing oxidation of organic materials.

(c) Case that Covering Layer is Formed with Composite Oxide of Silicon Oxide, Zirconium Oxide and Aluminum Oxide The amounts of silicon oxide, zirconium oxide and aluminum oxide contained in the covering layer are that the $SiO_2/(ZrO_2+Al_2O_3)$ weight ratio is in a range of from 98/2 to 6/4, and preferably from 95/5 to 7/3, when silicon oxide is calculated in terms of $SiO_2$, zirconium oxide is calculated in terms of $ZrO_2$ and aluminum oxide is calculated in terms of $Al_2O_3$.

When the total amount of $ZrO_2$ and $Al_2O_3$ is larger than the above $SiO_2/(ZrO_2+Al_2O_3)$ weight ratio range, Zr atoms and Al atoms, capable of trapping free radicals increase, but a dense covering layer is not formed. As a result, free radicals generated by the nuclear particles expose on the surface of the inorganic oxide fine particles, resulting in causing oxidation of organic materials. On the other hand, when the total amount of $ZrO_2$ and $Al_2O_3$ is smaller than the above $SiO_2/(ZrO_2+Al_2O_3)$ weight ratio range, a dense covering layer is liable to be formed. However, the total amount of Zr atoms and Al atoms, for trapping free radicals decreases, and free radicals generated by the nuclear particles expose on the surface of the inorganic oxide fine particles, resulting in causing oxidation of organic materials.

The covering layer has a thickness in a range of from 0.02 to 2.27 nm, and preferably from 0.16 to 1.14 nm, from the standpoint of preventing the phenomenon that free radicals generated by the nuclear particles expose on the surface of the inorganic oxide fine particles, resulting in causing oxidation of organic materials.

The "composite oxide constituting nuclear particle" used herein means a composite solid solution oxide (including doped composite oxide) and/or a composite oxide cluster, comprising titanium oxide and tin oxide, or a composite solid solution oxide (including doped composite oxide) and/or a composite oxide cluster, comprising tin oxide and silicon oxide. The composite oxide constituting the nuclear particle and/or covering layer may be a composite aqueous hydroxide having OH group at the terminal, and may contain the composite aqueous hydroxide as a part thereof.

The inorganic oxide fine particles containing titanium oxide have an average particle diameter in a range of from 1 to 200 nm, and preferably from 5 to 30 nm. Where the average particle diameter is less than 1 nm, particles are bridged with each other in the course of drying for forming the hard coat layer on the plastic lens substrate, and do not shrink uniformly. Further, its shrinkage decreases, and a hard coat layer having s sufficient film hardness is not obtained. On the other hand, where the average particle diameter exceeds 200 nm, the hard coat layer whitens, and such a whitened product is not suitable for use in optical members.

The inorganic oxide fine particles containing titanium oxide having a rutile crystal structure may be used alone, or may be used in combination with other inorganic oxide particles. Examples of the other inorganic oxide fine particles that can be used include oxides (including their mixtures) of at least one metal selected from Si, Al, Sn, Sb, Ta, Ce, La, Fe, Zn, W, Zr and In, and inorganic oxide fine particles comprising composite oxides containing at least two metals.

Specific example of the inorganic oxide fine particles is a dispersion medium comprising inorganic oxide fine particles with an average particle diameter of from 1 to 200 nm having a rutile crystal structure, dispersed in, for example, water, or an alcoholic or other organic solvent, in a colloidal form. Example of the commercially available dispersion medium includes a disperse sol for coating, containing inorganic oxide fine particles comprising nuclear particles of a composite oxide having a rutile crystal structure comprising titanium oxide and tin oxide, or comprising titanium oxide, tin oxide and silicon oxide, the surface of nuclear particles being covered with a covering layer of a composite oxide comprising silicon oxide, and zirconium oxide and/or aluminum oxide (OPTOLAKE, a product of Catalysts & Chemicals Ind. Co. Ltd.).

To increase dispersion stability in the coating composition, those inorganic oxide fine particles, the surface of which having been treated with an organosilicon compound, an amine compound, or a carboxylic acid such as tartaric acid or malic acid can be used.

Examples of the organosilicon compound used in this treatment include a monofunctional silane, a bifunctional silane, a trifunctional silane and tetrafunctional silane. In conducting the treatment, hydrolyzable groups may remain untreated, or may be hydrolyzed. After the hydrolysis treatment, the hydrolysable groups are preferably in a state of reacting with —OH groups of the fine particles, but even though the hydrolysable groups are in a partially residual state, there is no problem on safety.

Examples of the amine compound include ammonia; alkyl amines such as ethylamine, triethylamine, isopropylamine and n-propylamine; aralkyl amines such as benzylamine; alicyclic amines such as piperidine; and alkanol amines such as monoethanol amine and triethanol amine. The amount of those organosilicon compound, amine compound and the like is preferably in a range of from 1 to 15% by weight based on the weight of the inorganic oxide particles.

The kind and blending amount of the inorganic oxide fine particles are determined by the desired hardness, refractive index and the like. The blending amount is in a range of from 5 to 80% by weight, and preferably from 10 to 50% by weight, based on the weight of the solid contents in the hard coat composition. Where the blending amount is too small, abrasion resistance of the coating film may be insufficient. On the other hand, where the blending amount is too large, cracks may generate in the coating film, and dyeing affinity may also be insufficient.

The component B (organosilicon compound represented by the general formula: $R^1SiX^1_3$) is described below.

The component B functions as a binder of the hard coat layer. In the general formula: $R^1SiX^1_3$, $R^1$ is an organic group having a polymerizable reactive group, and having 2 or more carbon atoms. $R^1$ has the polymerizable reactive groups such as a vinyl group, an allyl group, an acrylic group, a methacrylic group, a 1-methylvinyl group, an epoxy group, a mercapto group, cyano group, isocyano group and an amino group.

$X^1$ is a hydrolyzable functional group, and examples thereof include an alkoxy group such as a methoxy group, an ethoxy group and a methoxyethoxy group, a halogen atom such as a chlorine atom and a bromine atom, and an acyloxy group.

Examples of the organosilicon compound as the component B include vinyltrialkoxysilane, vinyltrichlorosilane, vinyltri(β-methoxy-ethyoxy)silane, allyltrialkoxysilane, acryloxypropyltrialkoxysilane, methacryloxypropyltrialkoxysilane, γ-glycidoxypropyltrialkoxysilane, β-(3,4-epoxycyclohexyl)ethyltrialkoxysilane, mercaptopropyltrialkoxysilane, and γ-aminopropyltrialkoxysilane.

The organosilicon compound as the component B may be used as mixtures of two or more thereof.

The component A is mixed with the component B to produce a hard coat liquid for forming the hard coat layer. In such a production, it is preferable to mix a sol having the component A dispersed therein with the component B.

The blending amount of the component A is determined depending on hardness, refractive index and the like of the hard coat layer. The blending amount is generally from 5 to 80% by weight, and preferably from 10 to 50% by weight, based on the weight of the solid content in the hard coat liquid. Where the blending amount is too small, abrasion resistance of the hard coat layer is insufficient. On the other hand, where the blending amount is too large, cracks may generate in the hard coat layer. Further, where the hard coat layer is dyed, dyeing affinity may deteriorate.

The compound having a biphenyl sulfide structure as the component C is described below.

The component C acts as an adhering component between the primer layer and the hard coat layer, thereby improving durability. The biphenyl sulfide structure has a structure such that rigid benzene rings are bonded to a sulfur atom, and as a result the compound having such a specific structure has flexibility. Therefore, it is considered that the compound adheres to both the primer layer and the hard coat layer, and simultaneously exhibits flexibility. As a result, impact resistance can be improved. Further, the compound having a biphenyl sulfide structure is used in the hard coat layer, but is considered to localize between the primer layer and the hard coat layer, and does not substantially contribute to a crosslinking reaction of the hard coat layer itself. Therefore, the compound has the effect of not deteriorating mar resistance.

Examples of the compound having a biphenyl sulfide structure include 4,4'-thiobis(6-t-butyl-meta-cresol) and 2,2'-thiobis(4-methyl-6-t-butylphenol).

The addition amount of the compound having a biphenyl sulfide structure is preferably from 0.01 to 5.0% by weight, and more preferably from 0.03 to 1.0% by weight, based on the weight of the solid content in the coating composition. The term "solid content in the coating composition" used herein means main ingredients contained in the coating film obtained by drying and curing the coating composition. The term "weight of solid content" used herein means the total weight of the main ingredients such as a metal oxide sol, an organosilicon compound, a multifunctional epoxy compound and a catalyst, in the coating composition.

Where the amount of the compound having a biphenyl sulfide structure is less than 0.01% by weight, the above effects are not sufficiently exhibited, resulting in deterioration of durability and impact resistance. On the other hand, where the amount exceeds 5.0% by weight, the compound adversely affects the crosslinking reaction of the hard coat layer itself, resulting in deterioration of mar resistance.

It is very useful for the hard coat layer to contain a multifunctional epoxy compound. Durability and impact resistance can be improved by the compound having a biphenyl sulfide structure, but use of the multifunctional epoxy compound enables water resistance of the hard coat layer to improve and also enables adhesion to the primer layer as an undercoat to further stabilize. In particular, when hydroxyl groups are present in the molecule of the multifunctional epoxy compound, it is recognized that adhesion to the primer layer is improved. Therefore, by using the multifunctional epoxy compound having at least one hydroxyl group in one molecule, it is possible to decrease the blending amount of the whole multifunctional epoxy compound. As a result, it is possible to improve durability without deterioration of mar resistance. Additionally, when the antireflective layer described hereinafter is formed on the upper surface of the hard coat layer with an organic thin film, the antireflective film has very small thickness in many cases. In particular, where silica particles having inner voids are used in the antireflective film, moisture permeates the film. Therefore, the hard coat layer is required to have water resistance. Thus, the multifunctional epoxy compound is very useful.

Examples of the multifunctional epoxy compound include aliphatic epoxy compounds such as 1,6-hexanediol diglycidyl ether, ethylene glycol diglycidyl ether, diethylene glycol diglycidyl ether, triethylene glycol diglycidyl ether, tetraethylene glycol diglycidyl ether, nonaethylene glycol diglycidyl ether, propylene glycol diglycidyl ether, dipropylene glycol diglycidyl ether, tripropylene glycol diglycidyl ether, tetrapropylene glycol diglycidyl ether, nonapropylene glycol diglycidyl ether, neopentyl glycol diglycidyl ether, diglycidyl ether of neopentyl glycol hydroxyl pivalate, trimethylolpropane diglycidyl ether, trimethylolpropane triglycidyl ether, glycerol diglycidyl ether, glycerol triglycidyl ether, diglycerol diglycidyl ether, diglycerol triglycidyl ether, diglycerol tetraglycidyl ether, pentaerithritol diglycidyl ether, pentaerithritol triglycidyl ether, pentaerithritol tetraglycidyl ether, dipentaerithritol tetraglycidyl ether, sorbitol tetraglycidyl ether, diglycidyl ether of tris(2-hydroxyethyl)isocyanate, and triglycidyl ether of tris(2-hydroxyethyl)isocyanate; alicyclic epoxy compounds such as isophoronediol diglycidyl ether, and bis-2,2-hydroxycyclohexylpropane diglycidyl ether; and aromatic epoxy compounds such as resorcin diglycidyl ether, bisphenol A diglycidyl ether, bisphenol F diglycidyl ether, bisphenol S diglycidyl ether, orthophthalic acid diglycidyl ether, phenol novolac polyglycidyl ether, and cresol novolac polyglycidyl ether.

Of those, the aliphatic epoxy compounds such as 1,6-hexanediol diglycidyl ether, diethylene glycol diglycidyl ether, triethylene glycol diglycidyl ether, trimethylolpropane triglycidyl ether, glycerol diglycidyl ether, glycerol triglycidyl ether, and triglycidyl ether of tris(2-hydroxyethyl)isocyanate can preferably be used.

A curing catalyst may be added to the hard coat layer. Examples of the curing catalyst include perchloric acids such as perchloric acid, ammonium perchlorate and magnesium perchlorate; acetyl acetonates comprising Cu(II), Zn(II), Co(II), Ni(II), Be(II), Ce(III), Ta(III), Ti(III), Mn(III), La(III), Cr(III), V(III), Co(III), Fe(III), Al(III), Ce(IV), Zr(IV), and V(IV), as the central metal atom; amino acids such as amine and glycine; Lewis acids; and organic acid metal salts.

Of those, examples of the preferable curing catalyst include magnesium perchlorate and acetyl acetonates comprising Al (III) or Fe(III), as the central metal atom. In particular, the acetyl acetonate comprising Fe(III) as the central metal atom is most preferably used.

The addition amount of the curing catalyst is desirably in a range of from 0.01 to 5.0% by weight based on the weight of the solid content in the hard coat liquid.

If necessary, the coating composition for formation of the hard coat layer thus obtained can be used by diluting with a solvent. Examples of the solvent used include alcohols, esters, ketones, ethers and aromatics. Further, if necessary, the coating composition for formation of the hard coat layer can contain small amounts of a metal chelate compound, a surfactant, an antistatic agent, a ultraviolet absorber, an antioxidant, a disperse dye, an oil-soluble dye, a pigment, a photochromic compound, a hindered amine-based or hindered phenol-based light resistance and heat resistance stabilizer, and the like, thereby improving coating properties of the coating liquid, curing rate and coating performances after curing.

The application of the coating composition and the curing method are as follows. The coating composition is applied to the upper surface of the primer layer by dipping, spin coating, spray coating, roll coating or flow coating, and the resulting coating is dried under heating at a temperature of from 40 to 200° C. for several hours, thereby forming the hard coat film.

The hard coat layer has a thickness of preferably from 0.05 to 30 μm. Where the thickness is less than 0.05 μm the basic performances cannot be realized. On the other hand, where the thickness exceeds 30 μm surface smoothness may be impaired, or optical strain may generate.

4. Antireflective Layer

The antireflective layer is formed on the hard coat layer.

The antireflective layer formed has a refractive index at least 0.10 lower than the refractive index of the hard coat layer, and is an organic thin film having a film thickness of from 50 to 150 nm.

The organic thin film forming the antireflective layer is not limited so long as it has a refractive index at least 0.10 lower than the refractive index of the hard coat layer, and has a film thickness of from 50 to 150 nm. Organic thin films formed using a silicone, acrylic, epoxy, urethane or melamine resin, or using its raw material monomer alone; or organic thin films formed using those resins, or using its raw material monomer and other resin, or using at least two raw material monomers can preferably be used.

Of those, particularly in the case of considering various properties as the plastic lens, such as heat resistance, chemical resistance and mar resistance, it is preferable to form a low refractive index layer containing a silicone resin. It is more preferable to add finely granulated inorganic materials or the like in order to improve surface hardness or adjust the refractive index. Examples of the finely granulated inorganic materials added include sols dispersed in colloidal shape, and specific examples thereof include silica sol, magnesium fluoride sol and calcium fluoride sol.

The antireflective layer is an organic thin film formed using a coating composition comprising the following component D and component E.

Component D: An organosilicon compound represented by the following formula:

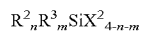

$$R^2_n R^3_m SiX^2_{4-n-m}$$

wherein $R^2$ represents an organic group having a polymerizable reactive group, $R^3$ represents a hydrocarbon group having from 1 to 6 carbon atoms, $X^2$ represents a hydrolysable group, n is 0 or 1, and m is 0 or 1.

Component E: Silica fine particles having an average particle diameter of from 1 to 150 nm.

Examples of the organic group having polymerizable reactive group, $R^2$, in the general formula $R^2_n R^3_m SiX^2_{4-n-m}$ include a vinyl group, an allyl group, an acrylic group, a methacrylic group, an epoxy group, a mercapto group, a cyano group and an amino group. Examples of the hydrocarbon group having from 1 to 6 carbon atoms, $R^3$, include a methyl group, an ethyl group, a butyl group, a vinyl group, a phenyl group and a perfluoroalkyl group. Examples of the hydrolyzable functional group (hydrolyzable group), $X^2$, include alkoxy groups such as a methoxy group, an ethoxy group and a methoxyethoxy group; halogen atoms such as a chlorine atom and a bromine atom; and acyloxy groups.

Examples of the organosilicon compound represented by the formula: $R^2_n R^3_m SiX^2_{4-n-m}$ include vinyltrialkoxysilane, vinyltrichlorosilane, vinyltri(β-methoxyethoxy)silane, allyltrialkoxysilane, acryloxypropyl trialkoxysilane, methacryloxypropyl trialkoxysilane, methacryloxypropyl dialkoxymethylsilane, γ-glycidoxypropyl trialkoxysilane, β-(3,4-epoxycyclohexyl)ethyl trialkoxysilane, mercaptopropyl trialkoxysilane, γ-aminopropyl trialkoxysilane, N-β-(aminoethyl)-γ-aminopropylmethyl dialkoxysilane, tetralakoxysilane, perfluoroalkyl trialkoxysilane and perfluoroalkyl trichlorosilane.

Examples of the silica fine particles as the component E include silica sols comprising silica fine particles having an average particle diameter of from 1 to 150 nm dispersed in a dispersion medium comprising water, alcoholic solvent or other organic solvent in a colloidal state. To achieve a low refractive index, it is preferable to use, for example, a silica sol comprising silica fine particles having voids or spaces formed inside thereof. When a gas or a solvent, having a refractive index lower than that of silica is contained in the inner voids of the silica fine particles, the refractive index of such silica fine particles is decreased as compared with silica fine particles having no inner voids, and as a result, a low refractive index of the antireflective layer is achieved.

The silica particles having inner voids can be produced by the method as described in, for example, JP-A-2001-233611. In the present embodiment, it is desirable to use the silica fine particles having an average particle diameter in a range of from 20 to 150 nm and a refractive index in a range of from 1.16 to 1.39. Where the average particle diameter of the particles is less than 20 nm, porosity in the inside of the particle decreases, and the desired low refractive index is not obtained. On the other hand, where the average particle diameter exceeds 150 nm, haze of the organic thin film increases, which is not preferable.

Examples of the silica fine particles having the inner voids include disperse sols containing hollow silica fine particles having an average particle diameter of from 20 to 150 nm and a refractive index of from 1.16 to 1.39 (THRULYA And L'ECUME, products of Catalysts & Chemicals Ind. Co. Ltd.).

The coating composition for forming the antireflective layer can contain various resins such as a polyurethane resin, an epoxy resin, a melamine resin, a polyolefin resin, a urethane acrylate resin and an epoxy acrylate resin; and various monomers that are raw materials of those resins, such as methacrylate monomers, acrylate monomers, epoxy monomers and vinyl monomers. Further, various fluorine-containing polymers or various fluorine-containing monomers can preferably be added to the coating composition for the purpose of reducing a refractive index.

The fluorine-containing polymer preferably is a polymer obtained by polymerizing a fluorine-containing vinyl monomer, and also preferably has a functional group copolymerizable with other component.

If necessary, such a coating composition for a low refractive index layer can be used by diluting with a solvent. Examples of the solvent that can be used include water, alcohols, esters, ketones, ethers and aromatics.

If necessary, the coating composition for a low refractive index layer, that contains the component D and the component E and forms the antireflective layer can further contain a curing catalyst, a surfactant, an antistatic agent, an ultraviolet absorber, and antioxidant, a light stabilizer such as hindered amine or hindered phenol, a disperse dye, an oil-soluble dye, a fluorescent dye and a pigment in small amounts, thereby improving coating property of the coating liquid and coating film performances after curing.

The antireflective layer is preferably that a coating film of the coating composition for a low refractive index layer is formed on the hard coat layer by a wet process.

Inorganic films formed by a dry process such as deposition method or sputtering has low heat resistance due to great difference in coefficient of thermal expansion to the hard coat layer comprising an organic coating film of a lower layer. Contrary to this, the antireflective layer comprising the organic thin film formed by a wet process has small difference in coefficient of thermal expansion to the hard coat layer. Therefore, cracks due to heating are difficult to generate, and heat resistance is excellent. Further, because the antireflective layer can be formed by a wet process, vacuum apparatus or large-sized facilities are not required, and the antireflective layer can be formed simply and easily.

The film-formation method of the antireflective layer having low refractive index by a wet process can use the conventional methods such as dipping method, spinner method, spraying method and flowing method. Of those film-formation methods, considering that a thin film having a thickness of from 50 to 150 nm in a curved surface shape, such as a lens is formed uniformly, dipping method or spinner method is preferably used.

In forming the antireflective layer having low refractive index on the hard coat layer, it is preferable to conduct a pretreatment to a surface of the hard coat layer. As the specific method of this pretreatment, a method of hydrophilicizing the surface of the hard coat layer with surface polishing, ultraviolet ray-ozone washing, plasma treatment or the like (contact angle $\theta=60°$ or less) is effective.

The specific film-formation method of the antireflective layer is conducted in the following procedures.

The organosilicon compound as the component D is diluted with an organic solvent, and if necessary, water, diluted hydrochloric acid, diluted acetic acid or the like is added thereto to conduct hydrolysis. A solution of 5 to 50% by weight of silica fine particles as the component E dispersed in an organic solvent in a colloidal state is added. Thereafter, if necessary, a surfactant, an ultraviolet absorber, an antioxidant or the like is added, followed by stirring adequately. The resulting mixture is used as a coating liquid.

In this case, the concentration of the diluted coating liquid is preferably from 0.5 to 15% by weight, and more preferably from 1 to 10% by weight, in terms of a solid content concentration, based on the weight of the solid content after curing. Where the solid content concentration exceeds 15% by weight, even if lifting speed is decreased in the dipping method, or the number of revolution is increased in the spinner method, it is difficult to obtain a desired film thickness, and the thickness becomes larger than the thickness as required. On the other hand, where the solid content concentration is less than 0.5% by weight, even if lifting speed is increased in the dipping method, or the number of revolution is decreased in the spinner method, the film thickness becomes smaller than the thickness as required, and it is difficult to obtain a desired film thickness. Further, too fast lifting speed or too low number of revolution tends to increase coating unevenness on the lens, and even though a surfactant or the like is added, it is difficult to respond to such a problem.

The antireflective layer is obtained by applying the coating liquid to a plastic lens, and curing the resulting coating with heat or ultraviolet rays. The curing is preferably conducted by heat treatment. Heating temperature in the heat treatment is determined considering the composition of the coating composition, heat resistance of the lens substrate and the like. The temperature is preferably from 50 to 200° C., and more preferably from 80 to 140° C.

The antireflective layer obtained is required to have a thickness in a range of from 50 to 150 nm. Where the thickness is larger than or smaller than this range, sufficient antireflective effect is not obtained. The antireflective layer is further required to have a refractive index difference to the refractive index of hard coat layer formed on a lower layer of 0.10 or more, preferably 0.15 or more, and more preferably 0.20 or more. The specific refractive index of the antireflective layer is in a range of preferably from 1.30 to 1.45.

To realize further low reflectivity and broad zone of low reflective region at a visible light region, it is possible to use a layer having further high refractive index as an intermediate layer in addition to the layer having a refractive index of from 1.30 to 1.45, thereby antireflective layer comprising a multilayer of two more layers is formed. The total film thickness of the antireflective film in this case is determined depending on the desired reflectivity, and therefore is not always required to be in a range of from 50 to 150 nm. However, where the antireflective layer comprises a multilayer of two or more layers, its production becomes complicated in many cases, and the above constitution is preferable in many cases.

The plastic lens comprising the lens substrate having formed thereon the primer layer, the hard coat layer and the antireflective layer as described above can further have an antifouling layer comprising an organosilicon compound containing fluorine on the upper surface of the antireflective layer for the purpose of improving water repellent and oil repellent performances of the plastic lens surface. The organosilicon compound containing fluorine used is preferably a fluorine-containing silane compound represented by the following general formula (2):

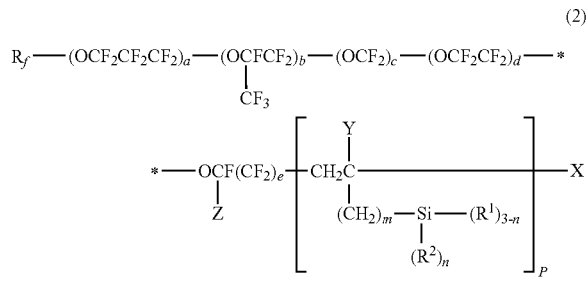

(2)

In the general formula (2), $R_f$ represents a linear or branched perfluoroalkyl group having from 1 to 16 carbon atoms, and is preferably $CF_3$—, $C_2F_5$— or $C_3F_7$—; $R_1$ represents a hydrolyzable group, and is preferably a halogen atom, —$OR^3$, —$OCOR^3$, —$OC(R^3)$=$C(R^4)_2$, —$ON$=$C(R^3)_2$, or —$ON$=$CR^5$, and more preferably a chlorine atom, —$OCH_3$ or —$OC_2H_5$, wherein $R^3$ represents an aliphatic hydrocarbon group or an aromatic hydrocarbon group; $R^4$ represents a hydrogen atom or a lower aliphatic hydrocarbon group; and $R^5$ represents a divalent aliphatic hydrocarbon group having from 3 to 6 carbon atoms.

$R^2$ represents a hydrogen atom or an inert monovalent organic group, and is preferably a monovalent hydrocarbon group having from 1 to 4 carbon atoms. a, b, c and d each are an integer of from 0 to 200, and are preferably an integer of from 1 to 50. e is 0 or 1. m and n each are an integer of from 0 to 2, and are preferably 0. p is an integer of 1 or more, and is preferably an integer of from 1 to 10.

The fluorine-containing silane compound represented by the general formula (2) has a molecular weight in a range of from $5\times10^2$ to $1\times10^5$, and preferably from $5\times10^2$ to $1\times10^4$.

Example of the preferable structure of the fluorine-containing silane compound represented by the general formula (2) includes the compound represented by the following general formula (3):

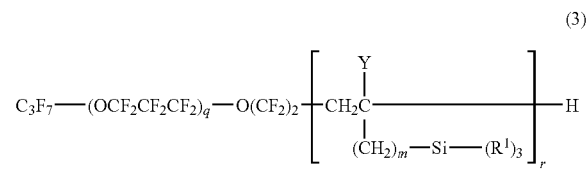

(3)

wherein Y represents a hydrogen atom or a lower alkyl group, $R^1$ represents a hydrolyzable group, q is an integer of from 1 to 50, m is an integer of from 0 to 2, and r is an integer of from 1 to 10.

The fluorine-containing silane compound represented by the general formula (2) or the general formula (3) can be applied to the antireflective layer using a method of dissolving the compound in an organic solvent, and applying the resulting water repellent treating liquid having a concentration adjusted to a predetermined concentration to the antireflective layer. The application method can use dipping, spin coating, spray coating, flow coating, doctor blade coating, roll coating, gravure coating, curtain flow coating, brush coating and the like.

The organic solvent is preferably an organic compound having a perfluoro group having excellent solubility of the fluorine-containing silane compound, and having 4 or more carbon atoms. Examples of the solvent include perfluorohexane, perfluorocyclobutane, perfluorooctane, perfluorodecane, perfluoromethylcyclohexane, perfluoro-1,3-dimethylcyclohexane, perfluoro-4-methoxybutane, perfluoro-4-ethoxybutane, and metaxylene hexafluoride. Perfluoroether oils and chlorotrifluoroethylene oligomer oils can also be used. Additionally, Freon 225 (a mixture of $CF_3CF_2CHCl_2$ and $CClF_2CH_2CHClF$) can be used. Those organic solvents can be used alone or as mixtures of two or more thereof.

When the organic solvent is diluted, its concentration is preferably in a range of from 0.03 to 1% by weight. Where the concentration is too low, it is difficult to form an antifouling layer having a sufficient thickness, and sufficient water repellent and oil repellent effect may not be obtained. On the other hand, where the concentration is too high, there is the possibility that the thickness of the antifouling layer is too large, and there is the possibility that load of rinsing operation for correcting coating unevenness after application increases.

Thickness of the antifouling layer is not particularly limited, but is preferably from 0.001 to 0.5 μm and more preferably from 0.001 to 0.03 μm. Where the antifouling layer has too small thickness, water repellent and oil repellent effect becomes poor, and where the antifouling layer has too large thickness, the layer surface becomes sticky, which are not preferable. Further, where the antifouling layer has a thickness exceeding 0.03 μm, antireflective effect deteriorates, which is not preferable.

When dipping is used as the application method of the water repellent treating liquid, a plastic lens is dipped in the water repellent treating liquid adjusted to a predetermined concentration using an organic solvent, and after passing a certain time, the plastic lens is lifted from the liquid at a constant speed. The dipping time is preferably from about 0.5 to 3 minutes. Where the dipping time is shorter than 0.5 minute, the water repellent is not sufficiently adsorbed on the surface of the plastic lens, and as a result, the desired water repellent performance cannot be obtained. Where the dipping time is longer than 3 minutes, it results in increase of cycle time, which is not preferable. The lifting speed is preferably from 100 to 300 mm/min. The lifting speed is determined depending on the concentration of the water repellent treating liquid. However, where the lifting speed is less than 100 mm/min, the antifouling layer is too thin, and the desired antifouling performance is not obtained. On the other hand, where the lifting speed is more than 300 mm/min, the antifouling layer is too thick, and there is the possibility that load of rinsing operation for correcting coating unevenness after application increases.

Examples based on the embodiment of the invention, and Comparative Examples are described below.

Example 1

(1) Preparation of Primer Composition 3,700 parts by weight of methyl alcohol, 250 parts by weight of water and 1,000 parts by weight of propylene glycol monomethyl ether were placed in a stainless steel-made vessel. After sufficiently stirring the resulting mixture, 2,800 parts by weight of composite fine particle sol mainly comprising titanium oxide, zirconium oxide and silicon oxide (anatase crystal structure, methanol dispersion, trade name: OPTOLAKE 1120ZU-25•A8) were added to the vessel, followed by stirring and mixing. 2,200 parts by weight of a polyester resin were added to the vessel, followed by stirring and mixing. 2 parts by weight of a silicone surfactant (trade name: L-7604, a product of Nippon Unicar Co.) were then added to the vessel, and the resulting mixture was continuously stirred overnight. The mixture was filtered with a filter of 2 μm to obtain a primer composition.

(2) Preparation of Hard Coat Composition 1,000 parts by weight of butyl cellosolve were placed in a stainless steel-made vessel, and 1,200 parts by weight of γ-glycidoxypropyl trimethoxysilane as the component B were added to the vessel. After sufficiently stirring the resulting mixture, 300 parts by weight of 0.1 mol/liter hydrochloric acid were added to the vessel, and resulting mixture was continuously stirred overnight to obtain a silane hydrolyzate. 30 parts by weight of a silicone surfactant (trade name: L-7001, a product of Nippon Unicar Co.) were to the silane hydrolyzate. After stirring the resulting mixture for 1 hour, 7,300 parts by weight of composite fine particle sol mainly comprising titanium oxide, tin oxide and silicon oxide (rutile crystal structure, methanol dispersion, trade name: OPTO-LAKE 1120Z 8RU-25•A17) as the component A were added to the vessel, followed by stirring and mixing for 2 hours. 250 parts by weight of an epoxy resin (trade name: DENACOL EX 313, a product of Nagase Kasei Kogyo K.K.) were added to the vessel, followed by stirring and mixing for 2 hours. 20 parts by weight of iron (III) acetyl acetonate and 10 parts by weight (0.5% by weight based on the weight of the solid content of coating composition) of 4,4'-thiobis(6-t-butyl-meta-cresol) as the component C were then added to the vessel, and the resulting mixture was stirred for 3 hours. The mixture was filtered with a filter of 2 μm to obtain a hard coat composition.

(3) Preparation of Low Refractive Index Film Coating Composition for Forming Antireflective Layer 208 parts by weight of tetramethoxysilane as the component D were placed in a stainless steel-made vessel, 356 parts by weight of methanol were added to the vessel, and 18 parts by weight of water and 18 parts by weight of 0.01N hydrochloric acid aqueous solution were then added to the vessel. The resulting mixture was well stirred using a disper to obtain a mixed liquid. This mixed liquid was stirred in a thermostat bath at a temperature of 25° C. for 2 hours to obtain a silane hydrolyzate. A hollow silica-isoporanol disperse sol (a product of Catalysts & Chemicals Ind. Co., Ltd., solid content concentration: 20%, average primary particle diameter: 35 nm, outer shell thickness: 8 nm) as the component E was blended with this silane hydrolyzate in a weight ratio of 70/30 to the silane hydrolyzate. 1 part by weight of a silicone surfactant (trade name: L-7001, a product of Nippon Unicar Co.) was mixed with the blend, and the resulting mixture was diluted with propylene glycol monomethyl ether so as to be a total solid content of 2%, thereby obtaining a low refractive index film coating composition.

(4) Formation of Primer Layer, Hard Coat Layer and Antireflective Layer

A thiourethane-based plastic lens substrate (trade name: SEIKO SUPER SOVEREIGN, a product of Seiko Epson Corporation, refractive index: 1.67) was provided.

The lens substrate thus provided was subjected to an alkali treatment (dipping in 2.0N potassium hydroxide aqueous solution maintained at 50° C. for 5 minutes, washing with pure water, and dipping in 0.5N sulfuric acid maintained at 25° C. for 1 minute to neutralize), washed with pure water, dried, and gradually cooled. The lens substrate thus treated was dipped in the primer composition prepared in (1), lifted from the composition at a lifting speed of 30 cm/min, and burned at 80° C. for 20 minutes to form a primer layer on the surface of the lens substrate. The lens substrate having the primer layer formed thereon was dipped in the hard coat composition prepared in (2), lifted from the composition at a lifting speed of 30 cm/min, and burned at 80° C. for 30 minutes to form a hard coat layer on the primer layer. The lens substrate thus treated was heated in an oven at 125° C. for 3 hours to obtain a plastic lens having the primer layer and the hard coat layer formed thereon. The primer layer formed had a thickness of 0.5 μm, and the hard coat layer formed had a thickness of 2.5 μm.

The plastic lens having the primer layer and the hard coat layer formed thereon was subjected to a plasma treatment (atmospheric plasma 300 W, 120 seconds), dipped in the low refractive index film coating composition prepared in (3), lifted from the composition at a lifting speed of 5 cm/min, burned at 80° C. for 30 minutes, and heated in an oven set to 100° C. for 2 hours to form an antireflective layer comprising a low refractive index film, thereby obtaining the plastic lens having the primer layer, the hard coat layer and the antireflective layer formed thereon. The antireflective layer formed had a thickness of 100 nm.

Example 2

A plastic lens having a primer layer, a hard coat layer and an antireflective layer formed thereon was obtained in the same manner as in Example 1, except that the antireflective layer was formed by the following dry process using a vacuum deposition, in place of the wet process using the low refractive index coating composition.

The antireflective layer was formed as follows. After subjecting the plastic lens having the primer layer and the hard coat layer formed thereon to a plasma treatment (argon plasma 400 W, 60 seconds), an antireflective multilayered film comprising five layers of $SiO_2$, $ZrO_2$, $SiO_2$, $ZrO_2$ and $SiO_2$ was formed on the plastic lens (hard coat layer) in the order toward the outside from the lens substrate by a vacuum deposition method using CES-21, a product of Shincron Co. Optical film thickness of each layer was such that the first $SiO_2$ layer, the second and third $ZrO_2$ and $SiO_2$ equivalent film layers, the fourth $ZrO_2$ layer and the outermost fifth $SiO_2$ layer were $\lambda/4$, respectively. Design wavelength was 520 nm.

Comparative Example 1

A plastic lens having a primer layer, a hard coat layer and an antireflective layer formed thereon was obtained in the same manner as in Example 1, except for forming the hard coat layer using the hard coat composition prepared by using 10 parts by weight of 2,2'-methylenebis(4-methyl-6-t-butylphenol) in which S (sulfur atom) in the biphenyl sulfide structure was replaced with C (carbon atom), in place of 4,4'-thiobis(6-t-butyl-meta-cresol).

Comparative Example 2

A plastic lens having a primer layer, a hard coat layer and an antireflective layer formed thereon was obtained in the same manner as in Example 1, except for forming the hard coat layer using the hard coat composition prepared by using 10 parts by weight (0.5% by weight based on the weight of the solid content of the coating composition) of 2,6-di-t-butyl-4- methylphenol having one phenol group in which S (sulfur atom) in the biphenyl sulfide structure was replaced with C (carbon atom), in place of 4,4'-thiobis(6-t-butyl-meta-cresol).

Comparative Example 3

A plastic lens having a primer layer, a hard coat layer and an antireflective layer formed thereon was obtained in the same manner as in Example 1, except for forming the hard coat layer using the hard coat composition prepared by using 10 parts by weight (0.5% by weight based on the weight of the solid content of the coating composition) of diethyl[[3,5-bis (1,1-dimethylethyl)-4-hydroxypheyl]methyl]phosphate having one phenol group and phosphate group in which S (sulfur atom) in the biphenyl sulfide structure was replaced with C (carbon atom), in place of 4,4'-thiobis(6-t-butyl-meta-cresol).

Comparative Example 4

A plastic lens having a primer layer, a hard coat layer and an antireflective layer formed thereon was obtained in the same manner as in Example 1, except for forming the hard coat layer using the hard coat composition prepared by using 10 parts by weight (0.5% by weight based on the weight of the solid content of the coating composition) of didodecyl-3,3'-thiodipropionate having S (sulfur atom) in the biphenyl sulfide structure but no biphenyl group, in place of 4,4'-thiobis (6-t-butyl-meta-cresol).

Comparative Example 5

A plastic lens having a primer layer, a hard coat layer and an antireflective layer formed thereon was obtained in the same manner as in Example 1, except for forming the hard coat layer using the hard coat composition prepared by using 100 parts by weight of 4,4'-thiobis(6-t-butyl-meta-cresol) in pace of 10 parts by weight (0.5% by weight based on the weight of the solid content of the coating composition) thereof.

Comparative Example 6

A plastic lens having a primer layer, a hard coat layer and an antireflective layer formed thereon was obtained in the same manner as in Example 1, except for forming the hard coat layer using the hard coat composition prepared by using 0.1 parts by weight of 4,4'-thiobis(6-t-butyl-meta-cresol) in pace of 10 parts by weight thereof.

Comparative Example 7

A plastic lens having a primer layer, a hard coat layer and an antireflective layer formed thereon was obtained in the same manner as in Example 1, except for using the hard coat composition prepared by using composite fine particle sol mainly comprising titanium oxide, zirconium oxide and silicon oxide (anatase crystal structure, methanol dispersion, trade name: OPTOLAKE 1120Z U-25•A8) in place of the composite fine particle sol mainly comprising titanium oxide, tin oxide and silicon oxide (rutile crystal structure, methanol dispersion, trade name: OPTOLAKE 1120Z 8RU-25•A17).

Properties of the plastic lenses (hereinafter simply referred to as "lens") obtained in Examples 1 and 2 and Comparative Examples 1 to 7 were evaluated by the following evaluation methods. The results obtained are shown in the Table below.

The evaluation items were 9 items of interference pattern, reflectivity, mar resistance, initial adhesion, moisture resistance, hot water resistance, light resistance, heat resistance and impact resistance. Each evaluation method is described below.

(1) Interference Pattern

A lens was placed just under a three-wavelength fluorescent lamp, and generation of interference pattern on lens surface was visually confirmed. A lens in which interference pattern was not substantially observed was evaluated as "Good", and a lens in which interference pattern was clearly observed was evaluated as "Poor".

(2) Reflectivity

Surface reflectivity of a lens surface was measured using a spectrophotometer, and converted to a reflectivity in which visibility was corrected according to a visibility curve measured.

(3) Mar Resistance

Steel wool #0000 was applied to a lens surface under a load of 1 kg, and rubbed thereon 10 reciprocations in a distance of 3 to 4 cm. State of mars formed on the lens surface was visually evaluated according to the following five criteria A to E.

A: No mar
B: 1 to 5 mars were observed.
C: 6 to 20 mars were observed.
D: 21 or more mars were observed, but not cloudy surface.
E: Many mars were observed, and substantially cloudy surface.

(4) Initial Adhesion

A lens surface was cut in a state of 100 cross-cuts at a distance of about 1 mm. An adhesive tape (registered trade mark: Cellotape, a product of Nichiban Co.) was strongly adhered to the cross-cut portion, and then rapidly peeled. Peeling state of films on the cross-cuts after peeling the adhesive tape was evaluated by the following five levels a to e.

a: No film peeling (cross-cuts of films peeled=0/100)
b: Substantially no film peeling (cross-cuts of films peeled=0 to 5/100)
c: Slight film peeling (cross-cuts of films peeled=6 to 20/100)
d: Film peeling (cross-cuts of films peeled=21 to 50/100)
e: Poor adhesion (cross-cuts of films peeled=51 to 100/100)

(5) Moisture Resistance

A lens was allowed to stand in a thermostat chamber (40° C., 90 RH %) for 10 days. The lens was taken out of the chamber, and then allowed to stand at room temperature for 3 hours. The lens thus treated was subjected to an adhesion test. The adhesion test was conducted in the same method and the same evaluation standard as in the initial adhesion (4) above.

(6) Hot Water Resistance

A lens was dipped in hot water of 80° C. for 2 hours. The lens was taken out of the hot water and cooled with water. The lens thus treated was subjected to an adhesion test. The adhesion test was conducted in the same method and the same evaluation standard as in the initial adhesion (4) above.

(7) Light Resistance

A lens was irradiated with a xenon long-life weatherometer (a product of Suga Test Instruments Co., Ltd.) for 200 hours. The lens was taken out of the xenon long-life weatherometer, and cooled with water. The lens thus treated was subjected to an adhesion test. The adhesion test was conducted in the same method and the same evaluation standard as in the initial adhesion (4) above.

(8) Heat Resistance

A lens was subjected to lens edging in conformity with an eyeglass frame shape, fitted to the eyeglass frame, and completely fixed to the frame with a screw. The eyeglass frame with the lens was placed in a thermostat chamber at 60° C. for 30 minutes. The frame was taken out of the chamber, and the lens was removed from the frame, and gradually cooled at room temperature for 1 hour. Generation of cracks on the lens surface was observed. When the lens did not generate cracks, the lens was further placed in a thermostat chamber at 65° C. for 30 minutes, and generation of cracks was observed. This procedure was repeated with increasing the temperature of the thermostat chamber every 5° C., and temperature at which cracks generated was determined as a heat resistant limiting temperature.

(9) Impact Resistance

In a test of vertically falling down a rigid ball of 16.3 g to a lens surface, a falling height was increased with every 10 cm from 127 cm. The falling height when the lens broken or the ball passed through the lens was measured.

TABLE

| | Interference pattern | Reflectivity (%) | Mar Resistance | Initial adhesion | Moisture resistance | Hot water resistance | Light Resistance | Heat Resistance (° C.) | Impact resistance (cm) | C component to solid content (wt %) |
|---|---|---|---|---|---|---|---|---|---|---|
| Example 1 | Good | 0.5 | a | a | a | b | b | 120 | 447 | 0.5 |
| Example 2 | Good | 0.5 | a | a | b | b | b | 85 | 327 | 0.5 |
| Comparative Example 1 | Good | 0.5 | b | a | c | c | c | 120 | 167 | 0.5 |
| Comparative Example 2 | Good | 0.5 | a | a | c | c | c | 115 | 147 | 0.5 |
| Comparative Example 3 | Good | 0.5 | b | a | c | c | c | 120 | 177 | 0.5 |
| Comparative Example 4 | Good | 0.5 | b | a | e | e | e | 125 | 177 | 0.5 |
| Comparative Example 5 | Good | 0.5 | d | a | a | b | b | 120 | 447 | 5.0 |
| Comparative Example 6 | Good | 0.5 | a | a | d | d | d | 120 | 147 | 0.01 |
| Comparative Example 7 | Good | 0.5 | a | a | a | a | d | 120 | 387 | 0.5 |

From the results shown in the Table, Examples 1 and 2 use the compound having a biphenyl sulfide structure represented by the general formula (1) as the component C in the coating composition for forming the hard coat layer, and therefore, moisture resistance, hot water resistance, light resistance and impact resistance are excellent. Example 1 forms the antireflective layer comprising an organic thin film, and therefore, heat resistance is also excellent. Contrary to this, Comparative Examples 1 to 4 use a compound that does not have a biphenyl sulfide structure, in the coating composition for forming the hard coat layer, and as a result, moisture resistance, hot water resistance, light resistance and impact resistance are poor.

Further, in Comparative Examples 5 and 6, the addition amount of the compound having a biphenyl sulfide structure is not an appropriate amount (from 0.03 to 1.0% by weight based on the weight of the solid content in the coating composition), and therefore, mar resistance is poor (Comparative Example 5), and moisture resistance, hot water resistance, light resistance and impact resistance are poor (Comparative Example 6). Further, Comparative Example 7 uses metal oxide fine particles having titanium oxide having an anatase crystal structure in the coating composition for forming the hard coat layer, and as a result, light resistance is insufficient.

The invention claimed is:

1. A plastic lens comprising a plastic lens substrate having formed thereon a primer layer, a hard coat layer and an organic antireflective layer, in the order from the surface of the plastic lens substrate, the hard coat layer being a coating film containing a multifunctional epoxy compound, and formed from a coating composition comprising the following component A, component B and component C:

Component A: Metal oxide fine particles having an average particle diameter of 1 to 200 nm and selected from composites of an oxide of titanium and an oxide of Silicon, Aluminum, Tin, Antimony, Tantalum, Cerium, Lanthanum, Iron, Zinc, Tungsten, Zirconium, or Indium;

Component B: An organosilicon compound represented by the following formula:

$R^1SiX^1_3$ wherein $R^1$ represents an organic group with 2 or more carbon atoms, having a polymerizable reactive group, and $X^1$ represents a hydrolysable group;

Component C: A compound having a biphenyl sulfide structure, represented by the following formula (1):

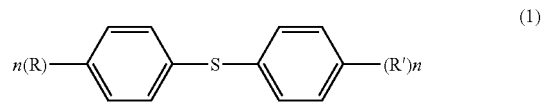

(1)

wherein R and R' each represent a hydrocarbon group or a hydroxyl group, and n is from 0 to 5, wherein the primer layer is formed from a coating composition containing a polyester resin;

and wherein the organic antireflective layer is a coating film formed from a coating composition comprising the following components D and E, and has a refractive index at least 0.20 lower than the refractive index of the hard coat layer, Component D: An organosilicon compound represented by the following formula:

$R^2_nR^3_mSiX^2_{4-n-m}$ wherein $R^2$ represents an organic group having a polymerizable reactive group, $R^3$ represents a hydrocarbon group having from 1 to 6 carbon atoms, $X^2$ represents a hydrolyzable group, n is 0 or 1, and m is 0 or 1;

Component E: Silica fine particles having an average particle diameter of from 1 to 150 nm, having inner voids, and having a refractive index in a range of from 1.16 to 1.39.

2. The plastic lens as claimed in claim 1, wherein the component C is contained in the coating composition in an amount of from 0.03 to 1.0% by weight based on the weight of the solid content in the coating composition.

3. A method of producing a plastic lens, which comprises a step of forming a primer layer on a plastic lens substrate, a step of forming a hard coat layer on the primer layer using a coating composition containing a multifunctional epoxy compound and comprising the following component A, component B and component C, and a step of forming an organic antireflective layer having a refractive index at least 0.20 lower than a refractive index of the hard coat layer using a composition comprising the following component D and component E, Component A: Metal oxide fine particles having an average particle diameter of 1 to 200 nm and selected from composites of an oxide of titanium and an oxide of Silicon, Aluminum, Tin, Antimony, Tantalum, Cerium, Lanthanum, Iron, Zinc, Tungsten, Zirconium, or Indium;

Component B: An organosilicon compound represented by the following formula $R^1SiX^1_3$ wherein $R^1$ represents an organic group with 2 or more carbon atoms, having a polymerizable reactive group, and $X^1$ represents a hydrolysable group;

Component C: A compound having a biphenyl sulfide structure, represented by the following formula (1):

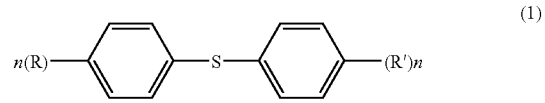

(1)

wherein R and R' each represent a hydrocarbon group or a hydroxyl group, and n is from 0 to 5;

Component D: An organosilicon compound represented by the following formula:

$R^2_n R^3_m SiX^2_{4-n-m}$ wherein $R^2$ represents an organic group having a polymerizable reactive group, $R^3$ represents a hydrocarbon group having from 1 to 6 carbon atoms, $X^2$ represents a hydrolyzable group, n is 0 or 1, and m is 0 or 1;

Component E: Silica fine particles having an average particle diameter of from 1 to 150 nm and have inner voids; and wherein the primer layer is formed from a coating composition containing a polyester resin.

* * * * *